(12) United States Patent
He et al.

(10) Patent No.: US 8,537,299 B2
(45) Date of Patent: Sep. 17, 2013

(54) LIQUID CRYSTAL DISPLAY COMPRISING FIRST AND SECOND CONTROL THIN FILM TRANSISTORS AND WHEREIN FIRST AND SECOND THIN FILM TRANSISTORS OF ADJACENT ROWS WITHIN A SAME COLUMN ARE CONNECTED TO A SAME COLUMN OF DATA LINES

(75) Inventors: Xiangfei He, Beijing (CN); Zhilong Peng, Beijing (CN); Wei Wang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 285 days.

(21) Appl. No.: 12/881,408

(22) Filed: Sep. 14, 2010

(65) Prior Publication Data

US 2011/0075062 A1    Mar. 31, 2011

(30) Foreign Application Priority Data

Sep. 25, 2009    (CN) .......................... 2009 1 0093183

(51) Int. Cl.
*G02F 1/136*    (2006.01)
*G09G 3/36*    (2006.01)

(52) U.S. Cl.
USPC .............................................. 349/48; 349/37

(58) Field of Classification Search
USPC .......................................... 349/36, 37, 48, 81
See application file for complete search history.

(56) References Cited

U.S. PATENT DOCUMENTS 6,707,441 B1 *    3/2004    Hebiguchi et al. .............. 345/92

FOREIGN PATENT DOCUMENTS

| CN | 1955824 A | 5/2007 |
| CN | 201203738 Y | 3/2009 |

* cited by examiner

*Primary Examiner* — Paul Lee
(74) *Attorney, Agent, or Firm* — Ladas & Parry LLP

(57) ABSTRACT

An array substrate comprises a plurality of pixel units defined by interacting of a plurality of gate lines along a row direction and a plurality of data lines along a column direction, and a pixel electrode formed within each of the pixel units. Each row of the pixel units are provide with a first gate line and a second gate line in the gate lines, and each of the pixel units is provides with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines.

6 Claims, 4 Drawing Sheets

LIQUID CRYSTAL DISPLAY COMPRISING FIRST AND SECOND CONTROL THIN FILM TRANSISTORS AND WHEREIN FIRST AND SECOND THIN FILM TRANSISTORS OF ADJACENT ROWS WITHIN A SAME COLUMN ARE CONNECTED TO A SAME COLUMN OF DATA LINES

BACKGROUND

Embodiments of the present invention relate to an array substrate, a driving device and method of the same, and a liquid crystal display.

In recent years, thin film transistor liquid crystal displays (TFT-LCDs) have undergone quick development, more and more TFT-LCDs of high quality have entered market, and their application fields are constantly expanding.

The main structure of a liquid crystal display comprises an array substrate and a color filter substrate assembled together with a liquid crystal layer interposed therebetween. The array substrate comprises gate lines, data lines, pixel electrodes and common electrode lines that are formed thereon, and the color filter substrate comprises black matrixes and color filters that are formed thereon. The gate lines provide scan signals, and the data lines provide data signals, and the pixel electrodes correspond to pixel units, and the common electrode lines provide a common voltage.

When a liquid crystal display works to represent images, a polarity reversal driving mode is typically used to prevent aging of liquid crystal. The typical polarity reversal mode comprises frame reversal, row reversal, column reversal or dot reversal.

With respect to the so-called polarity in polarity reversal mode, when a pixel voltage signal is higher than a common electrode signal, the polarity is referred to as "positive polarity"; and when the pixel voltage signal is lower than the common electrode signal, the polarity is referred to as "negative polarity." FIG. 1 is a schematic view showing an exemplary arrangement of a pixel array during the N-th frame in the conventional dot reversal mode; FIG. 2 is a schematic view showing an exemplary arrangement of the pixel array during the N+1-th frame in the conventional dot reversal mode. As shown in FIGS. 1 and 2, the characteristics lie in that the polarities of pixel units in adjacent rows are opposite to each other, and polarities of pixel units in adjacent columns are opposite to each other, and polarities of pixel units in adjacent frames are opposite to each other, that is, each pixel unit is opposite in polarity to all pixel units around it. In order to achieve such an effect of the dot reversal, signals output from the data lines are dot-reversed, which makes driving signals very complex and results in an increment in the power consumption.

It has been found at least the following problems: the conventional dot reversal driving mode is achieved by means of a driving chip, and the more complex the reversal mode is, the more excellent the performance of the driving chip is required, and thus, the manufacturing cost is accordingly increased.

SUMMARY

An embodiment of the present invention provides an array substrate, comprising a plurality of pixel units defined by interacting of a plurality of gate lines along a row direction and a plurality of data lines along a column direction, and a pixel electrode formed within each of the pixel units. Each row of the pixel units are provide with a first gate line and a second gate line in the gate lines, and each of the pixel units is provides with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines.

Another embodiment of the present invention further provides a driving device for the above array substrate comprising: a gate driver; and a data driver, wherein the gate driver controls the first gate line and the second gate line to alternately turn on in a period of one frame; the data driver is used to input first polarity voltage signals into odd columns of the data lines and to input second polarity voltage signals into even columns of the data lines during display, wherein the first polarity is opposite to the second polarity.

Still another embodiment of the present invention further provides a liquid crystal display comprising: an array substrate, comprising a plurality of pixel units defined by interacting of a plurality of gate lines along a row direction and a plurality of data lines along a column direction, and a pixel electrode formed within each of the pixel units, wherein each row of the pixel units are provide with a first gate line and a second gate line in the gate lines, and each of the pixel units is provides with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines; and a driving device, comprising: a gate driver; and a data driver, wherein the gate driver controls the first gate line and the second gate line to alternately turn on in a period of one frame; the data driver is used to input first polarity voltage signals into odd columns of the data lines and to input second polarity voltage signals into even columns of the data lines during display, wherein the first polarity is opposite to the second polarity.

Still another embodiment of the present invention further provides a method of driving the array substrate as mentioned above, comprising: during a N-th frame, applying voltage signals having opposite polarities to adjacent data lines and controlling the first gate line to perform row-by-row scanning; and during a N+1-th frame, still applying the voltage signals having opposite polarities to the adjacent data lines and controlling the second gate line to perform row-by-row scanning and controlling the first gate line to stop row-by-row scanning.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 6 is a schematic view showing the arrangement of a pixel array during the N-th frame in the dot reversal mode of a driving device according to an embodiment.

DETAILED DESCRIPTION

Embodiments of the present invention provide an array substrate, a driving device and method of the array substrate, and a liquid crystal display, which are intended to achieve the dot reversal driving while decreasing the manufacturing cost.

Hereinafter, a TFT-LCD array substrate, a driving device and method of the array substrate and a liquid crystal display according to the embodiments of the present invention will be described in detail with reference to the accompanying drawings.

Embodiment 1

Figure 1:
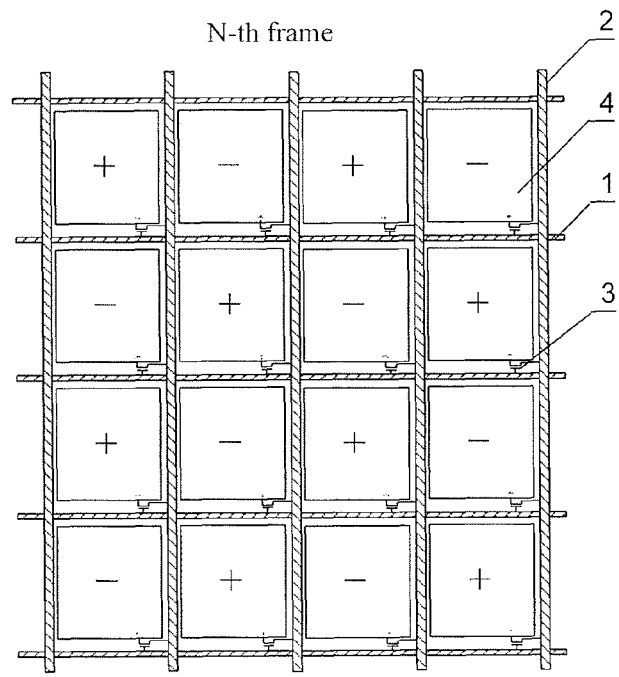
FIG. 1 is a schematic view showing an exemplary arrangement of a pixel array during the N-th frame in the conventional dot reversal mode.
Figure 2:
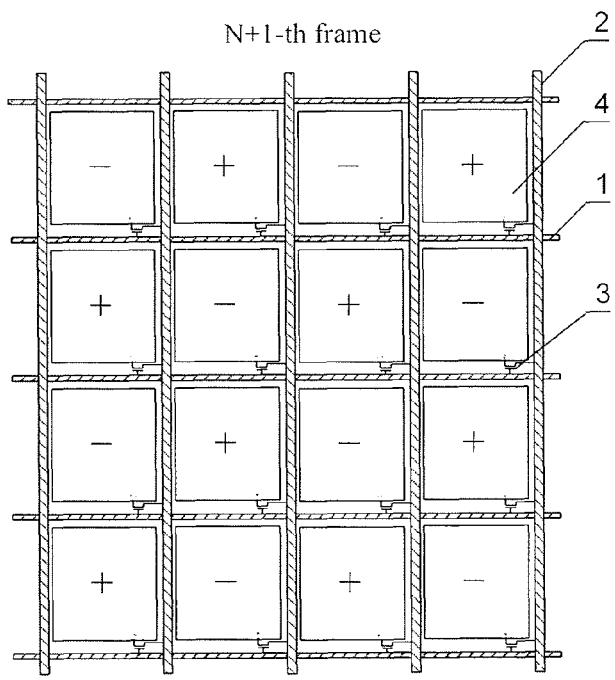
FIG. 2 is a schematic view showing an exemplary arrangement of a pixel array during the N+1-th frame in the conventional dot reversal mode.
Figure 3:
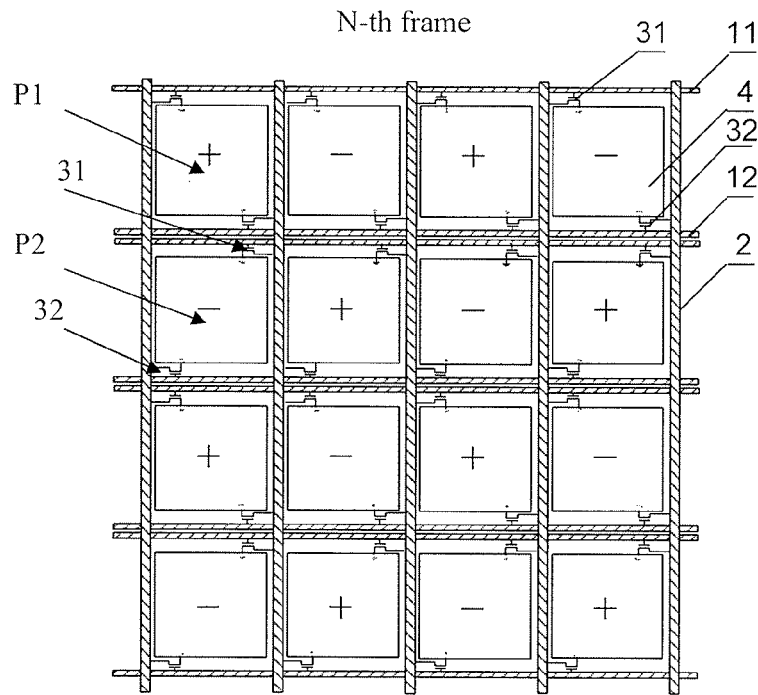
FIG. 3 is a schematic view showing the N-th frame in the dot reversal mode of an array substrate according to an embodiment.

FIG. 3 is a schematic view showing the N-th frame in the dot reversal mode of a TFT-LCD array substrate according to an embodiment. As shown in FIG. 3, the embodiment provides a TFT-LCD array substrate, which comprises a plurality of pixel units defined by intersecting of gate lines disposed along the row direction and data lines 2 disposed along the column direction. There are thin film transistors (TFTs) and a pixel electrode formed in each pixel unit. In the TFT-LCD array substrate of the embodiment, each pixel unit row is provided with a first gate line 11 and a second gate line 12, and each pixel unit is provided with a first TFT 31 and a second TFT 32. The first TFT 31 is connected with the first gate line 11, and the second TFT 32 is connected with the second gate line 12. Further, the first TFT 31 is connected to one data line 2 at one side of the pixel unit, and the second TFT 32 is connected to another data line 2 at the other side of the pixel unit. The second TFT 32 in one pixel unit P1 in one pixel unit row (the current pixel unit row) and the first TFT 31 in another pixel unit P2 in one adjacent pixel unit row and within the same column as the pixel unit P1 are connected to the same the data line 2.

Figure 4:
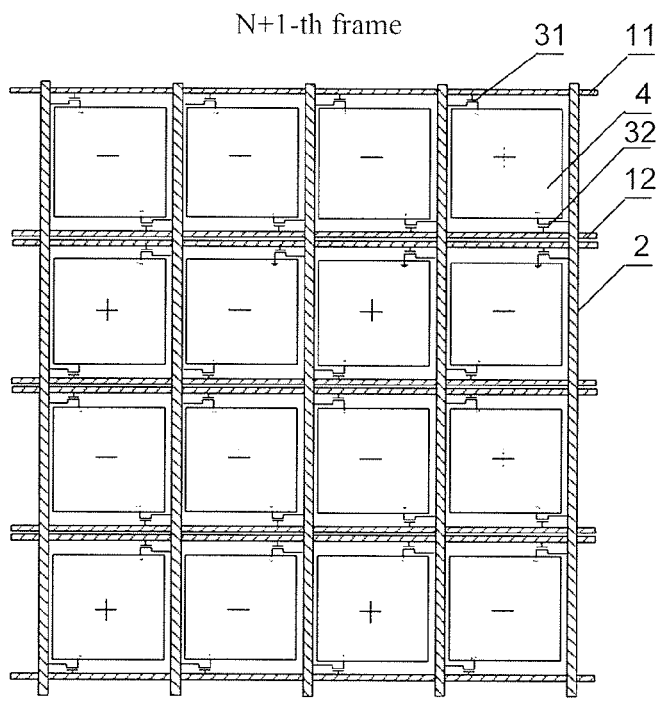
FIG. 4 is a schematic view showing the N+1-th frame in the dot reversal mode of the array substrate according to an embodiment.

As shown in FIG. 3, each pixel unit is provided with two TFTs, that is, the first TFT 31 and the second TFT 32, which are respectively connected with two adjacent data lines 2 on two sides of the pixel column and each of which is controlled by respective one gate line. In operation, during the N-th frame, only the first gate lines 11 (or the second gate lines 12) perform row-by-row scanning, and polarities of signals transferred over adjacent data lines 2 are opposite to each other. Because the TFTs 31 or 32 in each row are arranged to stagger from each other, the actual display effect is not in a column reversal mode but a dot reversal mode. As shown in FIG. 4, during the N+1-th frame, only the second gate lines 12 (or the first gate lines 11) perform row-by-row scanning, and signals transferred over the adjacent data lines 2 are still opposite to each other in polarity and thus, the actual display effect is still in a dot reversal mode. At the same time, the characteristic of the dot reversal is also shown between the N-th frame and the N+1-th frame, and the reversal between adjacent frames is achieved as well.

In the TFT-LCD array substrate provided by the embodiment, two TFTs are arranged in each pixel unit, and the two TFTs are respectively connected to two adjacent data lines and respectively controlled through corresponding gate lines, thus no complex driving chip is needed and the dot reversal function can be achieved. At the same time, power consumption is reduced for the array substrate, and the manufacturing cost also is decreased.

Embodiment 2

This embodiment further provides a driving device for driving the TFT-LCD array substrate as described in the embodiment 1. The driving device comprises a gate driver and a data driver.

The TFT-LCD array substrate comprises a plurality of pixel units defined by intersecting of gate lines and data lines 2, and TFTs and a pixel electrode are formed within each pixel unit. Each pixel unit row is provided with a first gate line 11 and a second gate line 12, and each pixel unit is provided with a first TFT 31 and a second TFT 32. The first TFT 31 is connected with the first gate line 11 for the pixel unit, and the second TFT 32 is connected with the second gate line 12 for the pixel unit. The first TFT 31 is connected to one data line 2 at one side of the pixel unit, and the second TFT 32 is connected to another data line 2 at the other side of the pixel unit. The second TFT 32 of the pixel unit P1 in the current pixel unit row and the first TFT 31 of the pixel unit P2 in the adjacent pixel unit row thereof within the same column are connected to the same column of the data line 2.

The gate driver controls the first gate line 11 and the second gate line 12 for each pixel unit to alternately turn on with the period of one frame.

The data driver, for example, is used to input positive polarity voltage signals to odd columns of the data lines and negative polarity voltage signals to even columns of the data lines during display; or, the data driver, for example, is used to input negative polarity voltage signals to odd columns of the data lines and positive polarity voltage signals to even columns of the data lines during display.

Figure 5:
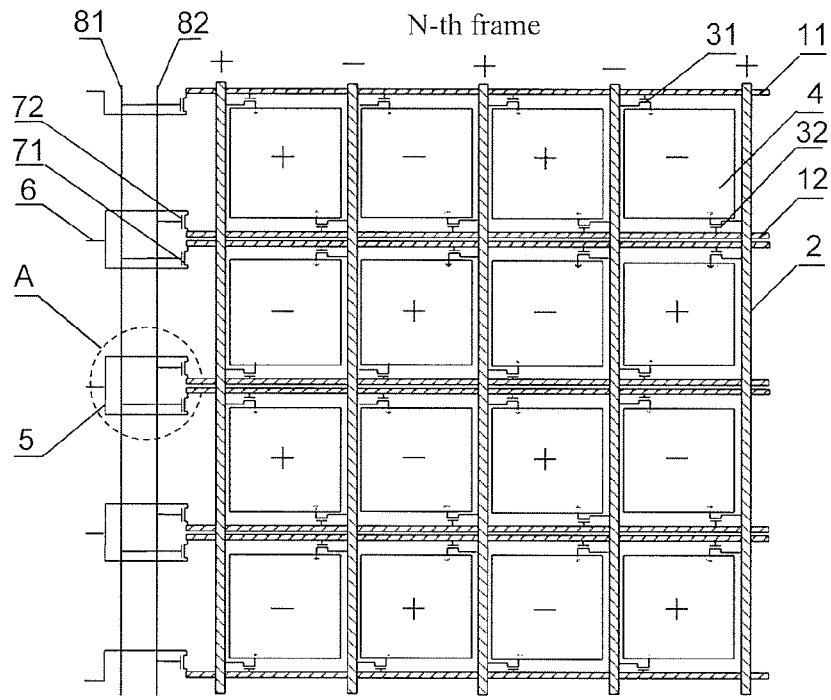
Figure 6:
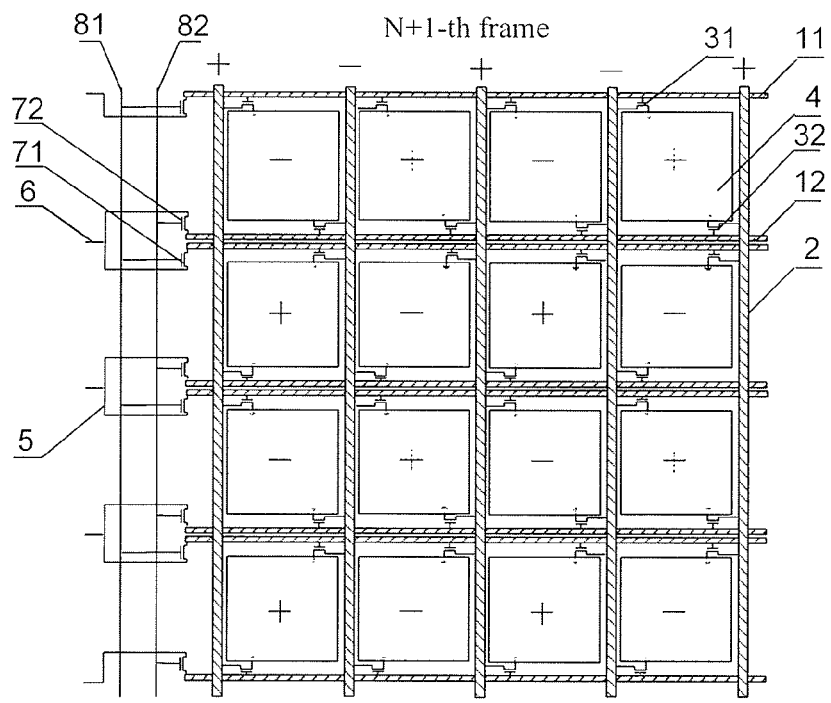
FIG. 6 is a schematic view showing the arrangement of a pixel array during the N+1-th frame in the dot reversal mode of a driving device according to an embodiment.

As shown in FIG. 5 and FIG. 6, each pixel unit is provided with two TFTs, that is, a first TFT 31 and a second TFT 32, which are respectively connected with two adjacent data lines 2 and are controlled by respective gate lines. In operation, during the N-th frame, the gate driver controls one kind of the first gate lines 11 and the second gate lines 12 to perform row-by-row scanning, and polarities of signals transferred over adjacent data lines 2 are opposite to each other. Because the TFTs 31 and 32 in each row are arranged to stagger from each other, an actual display effect is not in a column reversal mode but a dot reversal mode. As shown in FIG. 12, during the N+1-th frame, the gate driver controls the other kind of the first gate lines 11 and the second gate lines 12 to perform row-by-row scanning, and signals transferred by the adjacent data lines 2 are still opposite to each other in polarity, and thus, an actual display effect is in the dot reversal mode. At the same time, the characteristic of the dot reversal is also shown between the N-th frame and the N+1-th frame, and the reversal between adjacent frames is achieved as well.

The driving device according to the embodiment comprises the gate driver to control two gate lines for each pixel unit to alternately turn on and the data driver that provides two adjacent data lines with voltage signals having opposite polarities. Therefore, the dot reversal mode can be achieved while the manufacturing cost is decreased without the complex driving chip.

Taking into consideration aperture ratio, the above array substrate is preferably applicable to a large-sized liquid panel.

Embodiment 3

This embodiment provides a driving device comprising gate drivers. For example, the gate driving device comprises a first gate driver and a second gate driver. The first gate driver controls a first gate line 11, and the second gate driver controls a second gate line 12 for each pixel unit, so that the first gate line 11 and the second gate line 12 are alternately turned on with the period of one frame.

The first gate driver and the second gate driver are provided to control the first gate line 11 and the second gate line 12 for each pixel unit to alternately turn on with a period of one frame, and thus, the design is simplified and easily achieved.

Embodiment 4

Figure 7:
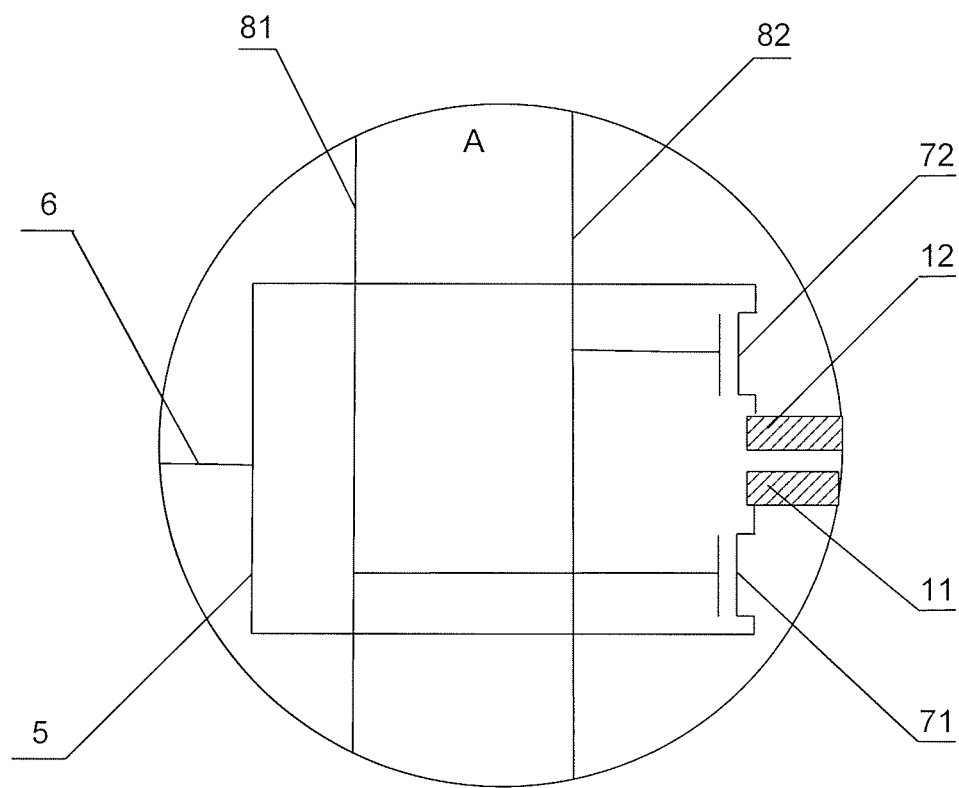
FIG. 7 is an enlarged partial schematic view of "A" region in FIG. 5.

Basing on the embodiment 1, and further, as shown in FIG. 7, a gate driver is connected with the first gate line 11 and the second gate line 12 for each pixel unit through a control device 5 and controls the first gate line 11 and the second gate line 12 for each pixel unit to alternately turn on with a period of one frame by control signals.

Further, the control device 5 may comprises: a first control TFT 71 and a second control TFT 72, and source electrodes of the first control TFT 71 and the second control TFT 72 are connected to the gate driver through a periphery gate line 6; a gate electrode of the first control TFT 71 is connected to a first control signal line 81, and a gate electrode of the second control TFT 72 is connected to a second control signal line 82; a drain electrode of the first control TFT 71 is connected to the first gate line 11, and a drain electrode of the second control TFT 72 is connected to the second gate line 12.

There are various ways to make the first gate line 11 and the second gate line 12 for each pixel unit to alternately perform row-by-row scanning. For example, as shown in FIG. 7, the first gate line 11 for a pixel unit is connected to the periphery gate line 6 through the first control TFT 71, and thus whether the first gate line 11 is electrical connected with the periphery gate line 6 or not is controlled by a voltage signal of the first control signal line 81; the second gate line 12 for a pixel unit is connected to the periphery gate line 6 through the second control TFT 72, and thus whether the second gate line 12 is electrical connected with the periphery gate line 6 or not is controlled by a voltage signal of the second control signal line 82. Further, the first control signal line 81 and the second control signal line 82 are connected with a timing controller, and the timing controller alternately supplies control signals to the first control signal line 81 and the second control signal line 82 with the period of one frame. The timing controller may be, for example, embodied as a timing controller provided on a PCB board. As shown in FIG. 5, during the N-th frame, the electrical signal over the first control signal line 81 is at a high level, and the electrical signal over the second control signal line 82 is at a low level, and at this time, the first gate line 11 for a pixel unit is connected to the periphery gate line 6, and the second gate line 12 for the pixel unit is disconnected to the periphery gate line 6; during the N+1-th frame, the electrical signal over the first control signal line 81 is at a low level, and an electrical signal over the second control signal line 82 is at a high level, and at this time, the first gate line 11 for the pixel unit is disconnected to the periphery gate line 6, and the second gate line 12 for the pixel unit is connected to the periphery gate line 6. That is, by controlling the signals over the first control signal line 81 and the second control signal line 82, the first gate lines 11 and the second gate lines 12 for the pixel units may alternately perform row-by-row scanning with a period of one frame.

Therefore, by the driving device according to the embodiment, signals having opposite polarities between adjacent columns may be supplied to the adjacent data lines only, the polarities of the data signals can be unchanged between frames, and thus, the complex dot reversal effect can be obtained. The complex polarity reversal driving chip is not necessary any more. Because the polarities of the data signals transferred over the data lines need not be reversed periodically over time, the power consumption of a finished product is accordingly reduced, and the purpose of reducing the manufacturing cost is achieved as well.

Embodiment 5

This embodiment further provides a liquid crystal display, comprising: a liquid panel employing the TFT-LCD array substrate as described in the embodiment 1 and a driving device for driving the TFT-LCD array substrate, and the driving device comprises a gate driver and a data driver.

The gate driver controls the first gate line and the second gate line for each pixel unit to alternately turn on with a period of one frame.

The data driver is used to input positive polarity voltage signals to odd columns of the data lines and negative polarity voltage signals to even columns of the data lines during display; or, the data driver is used to input negative polarity voltage signals to odd columns of the data lines and positive polarity voltage signals to even columns of the data lines during display.

The liquid crystal display according to the embodiment may provide signals having opposite polarities between adjacent columns with the data lines only, the polarities of the signals are not changed between frames, and thus, the complex dot reversal effect can be obtained without needing the complex polarity reversal driving chip. In addition, because the polarities of the signals transferred over the data lines need not be reversed periodically over time, the power consumption of a finished product is accordingly reduced, and the purpose of reducing the manufacturing cost is achieved.

Embodiment 6

The embodiment further provides a driving method, comprising:

Step S1, during the N-th frame, applying voltage signals having opposite polarities to adjacent data lines, and controlling the first gate line or second gate line for each pixel unit to perform row-by-row scanning;

Step S2, during the N+1-th frame, still applying the voltage signals having opposite polarities to the adjacent data lines, and controlling the gate lines not performing row-by-row scanning during the N-th frame among the first gate line and the second gate line for each pixel unit to perform row-by-row scanning while controlling the gate line which performs row-by-row scanning during the N-th frame to stop row-by-row scanning.

Applying the voltage signals having opposite polarities to the adjacent data lines comprises: to input positive polarity voltage signals to odd columns of the data lines, and to input negative polarity voltage signals to even columns of the data lines; or, to input negative polarity voltage signals to odd columns of the data lines, and to input positive polarity voltage signals to even columns of the data lines.

In a method for driving a liquid crystal display according to this embodiment, by only providing signals having opposite polarities with the adjacent data lines and maintaining the polarities of the signals constant between frames, the complex dot reversal effect can be obtained without needing the complex polarity reversal driving chip. Because the polarities of the signals transferred over the data lines need not be reversed periodically over time, the power consumption of a finished product is accordingly reduced, and the purpose of reducing the manufacturing cost is achieved.

The above description only describes detailed embodiments, and it is not a limitation of the protection scope. Accordingly, it should be understood that many modifications or alternation which can be made easily by those of ordinary skill in the art within the disclosure of the present invention, will fall within the scope of the present invention as defined by the appended claims.

What is claimed is:

1. An array substrate, comprising a plurality of pixel units defined by interacting of a plurality of gate lines along a row direction and a plurality of data lines along a column direction, and a pixel electrode formed within each of the pixel units,
wherein each row of the pixel units are provided with a first gate line and a second gate line in the gate lines, and each of the pixel units is provided with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines,
wherein a gate driver is connected to the first gate line and the second gate line through a control device and controls the first gate line and the second gate line for each pixel unit to alternately turn on with a period of one frame by a control signal,
wherein the control device comprises:
a first control thin film transistor; and
a second control thin film transistor,
wherein source electrodes of the first control thin film transistor and the second control thin film transistor are connected to the gate driver through a periphery gate line; a gate electrode of the first control thin film transistor is connected with a first control signal line, and a gate electrode of the second control thin film transistor is connected with a second control signal line; a drain electrode of the first control thin film transistor is connected with the first gate line and a drain electrode of the second control thin film transistor is connected with the second gate line,
wherein the first control signal line and the second control signal line are connected with a timing controller, and the timing controller provides control signals with the first control signal line and the second control signal line with the period of one frame.

2. A driving device for an array substrate, wherein the array substrate comprises a plurality of pixel units defined by interacting of a plurality of gate lines along a row direction and a plurality of data lines along a column direction, and a pixel electrode formed within each of the pixel units, wherein each row of the pixel units are provided with a first gate line and a second gate line in the gate lines, and each of the pixel units is provided with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines
the driving device comprising:
a gate driver; and
a data driver,
wherein the gate driver controls the first gate line and the second gate line for each pixel unit to alternately turn on with a period of one frame, the data driver inputs first polarity voltage signals to odd columns of the data lines and second polarity voltage signals to even columns of the data lines during display, and wherein the first polarity is opposite to the second polarity,
wherein the gate driver is connected to the first gate line and the second gate line through a control device and controls the first gate line and the second gate line for each pixel unit to alternately turn on with the period of one frame by a control signal,
wherein the control device comprises:
a first control thin film transistor; and
a second control thin film transistor,
wherein source electrodes of the first control thin film transistor and the second control thin film transistor are connected to the gate driver through a periphery gate line; a gate electrode of the first control thin film transistor is connected with a first control signal line, and a gate electrode of the second control thin film transistor is connected with a second control signal line; a drain electrode of the first control thin film transistor is connected with the first gate line and a drain electrode of the second control thin film transistor is connected with the second gate line,
wherein the first control signal line and the second control signal line are connected with a timing controller, and the timing controller provides control signals with the first control signal line and the second control signal line with the period of one frame.

3. The driving device as claimed in claim 2, wherein the first polarity voltage signal is selected from a group consisting of a positive polarity voltage signal and a negative polarity voltage signal.

4. The driving device as claimed in claim 2, wherein the gate driver comprises a first gate driver and a second gate driver, and wherein the first gate driver controls the first gate line and the second gate driver controls the second gate line so that the first gate line and the second gate line for each pixel unit alternately turn on with the period of one frame.

5. A liquid crystal display, comprising:

an array substrate, comprising a plurality of pixel units defined by interacting of a plurality of gate lines along a row direction and a plurality of data lines along a column direction, and a pixel electrode formed within each of the pixel units, wherein each row of the pixel units are provided with a first gate line and a second gate line in the gate lines, and each of the pixel units is provided with a first thin film transistor and a second thin film transistor; the first thin film transistor is connected with the first gate line, and the second thin film transistor is connected with the second gate line; the first thin film transistor is connected with the data line at one side of the pixel unit, and the second thin film transistor is connected with the data line at the other side of the pixel unit, and the second thin film transistors of the pixel units in one row and the first thin film transistors of the pixel units in an adjacent row within the same columns are connected to the same column of the data lines; and a driving device, comprising:
  a gate driver; and
  a data driver,
  wherein the gate driver controls the first gate line and the second gate line for each pixel unit to alternately turn on with a period of one frame, and the data driver inputs first polarity voltage signals into odd columns of the data lines and second polarity voltage signals into even columns of the data lines during display; and wherein the first polarity is opposite to the second polarity,
wherein the gate driver is connected to the first gate line and the second gate line through a control device and controls the first gate line and the second gate line for each pixel unit to alternately turn on with the period of one frame by a control signal,
wherein the control device comprises:
  a first control thin film transistor; and
  a second control thin film transistor,
  wherein source electrodes of the first control thin film transistor and the second control thin film transistor are connected to the gate driver through a periphery gate line; a gate electrode of the first control thin film transistor is connected with a first control signal line, and a gate electrode of the second control thin film transistor is connected with a second control signal line; a drain electrode of the first control thin film transistor is connected with the first gate line and a drain electrode of the second control thin film transistor is connected with the second gate line,
  wherein the first control signal line and the second control signal line are connected with a timing controller, and the timing controller provides control signals with the first control signal line and the second control signal line with the period of one frame.

6. The liquid crystal display as claimed in claim 5, wherein the first polarity voltage signal is selected from a group consisting of a positive polarity voltage signal and a negative polarity voltage signal.

* * * * *